US011809899B2

(12) United States Patent
Chitlur et al.

(10) Patent No.: US 11,809,899 B2
(45) Date of Patent: Nov. 7, 2023

(54) METHODS AND APPARATUS FOR ACCELERATING VIRTUAL MACHINE MIGRATION

(71) Applicant: Intel Corporation, Santa Clara, CA (US)

(72) Inventors: Nagabhushan Chitlur, Portland, OR (US); Mariano Aguirre, Portland, OR (US); Stephen S. Chang, Hillsboro, OR (US); Rohan Menezes, Hillsboro, OR (US); Michael T. Werstlein, Portland, OR (US); Jonathan Lo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 16/584,716

(22) Filed: Sep. 26, 2019

(65) Prior Publication Data

US 2020/0026556 A1    Jan. 23, 2020

Related U.S. Application Data

(60) Provisional application No. 62/868,242, filed on Jun. 28, 2019.

(51) Int. Cl.
| | |
|---|---|
| *G06F 9/48* | (2006.01) |
| *G06F 9/455* | (2018.01) |
| *G06F 12/0882* | (2016.01) |
| *G06F 13/16* | (2006.01) |
| *G06F 12/1081* | (2016.01) |

(52) U.S. Cl.
CPC ........ *G06F 9/4856* (2013.01); *G06F 9/45558* (2013.01); *G06F 12/0882* (2013.01); *G06F 12/1081* (2013.01); *G06F 13/1668* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 4,099,242 | A | 7/1978 | Houston |
| 5,307,504 | A | 4/1994 | Robinson |
| 5,432,795 | A | 7/1995 | Robinson |
| 6,242,269 | B1 | 6/2001 | Whetsel |
| 8,346,726 | B2 | 1/2013 | Liu et al. |

(Continued)

*Primary Examiner* — Wynuel S Aquino
(74) *Attorney, Agent, or Firm* — Fletcher Yoder, P.C.

(57) ABSTRACT

A server having a host processor coupled to a programmable coprocessor is provided. One or more virtual machines may run on the host processor. The coprocessor may be coupled to an auxiliary memory that stores virtual machine (VM) states. During live migration, the coprocessor may determine when to move the VM states from the auxiliary memory to a remote server node. The coprocessor may include a coherent protocol home agent and state tracking circuitry configured to track data modification at a cache line granularity. Whenever a particular cache line has been modified, only the data associated with that cache line will be moved to the remote server without having to copy over the entire page, thereby substantially reducing the amount of data that needs to be transferred during migration events.

20 Claims, 7 Drawing Sheets

(56) References Cited

U.S. PATENT DOCUMENTS

| | | |
|---|---|---|
| 8,621,275 B1 | 12/2013 | Havemose |
| 8,667,066 B1 | 3/2014 | Havemose |
| 8,750,206 B2 | 6/2014 | Feder et al. |
| 8,799,586 B2 | 8/2014 | Kumar et al. |
| 8,943,248 B2 | 1/2015 | Visalli |
| 9,043,640 B1 | 5/2015 | Havemose |
| 9,054,917 B2 | 6/2015 | Khesin |
| 9,483,291 B1 | 11/2016 | Chen et al. |
| 10,169,065 B1 | 1/2019 | Nye et al. |
| 10,216,254 B1 | 2/2019 | Rao et al. |
| 10,235,247 B1* | 3/2019 | Natanzon .............. G06F 12/109 |
| 2008/0215820 A1 | 9/2008 | Conway |
| 2009/0094603 A1 | 4/2009 | Hiltgen |
| 2010/0250824 A1 | 9/2010 | Belay |
| 2010/0325367 A1* | 12/2010 | Kornegay ........... G06F 12/0804 |
| | | 711/143 |
| 2011/0004732 A1 | 1/2011 | Krakirian et al. |
| 2011/0047362 A1* | 2/2011 | Eichenberger ........ G06F 9/3851 |
| | | 712/E9.035 |
| 2011/0179415 A1 | 7/2011 | Donnellan |
| 2011/0219208 A1 | 9/2011 | Asaad |
| 2012/0030306 A1 | 2/2012 | Kami |
| 2012/0166852 A1 | 6/2012 | Sodhi |
| 2012/0179650 A1 | 7/2012 | Vechev |
| 2012/0254862 A1 | 10/2012 | Dong |
| 2013/0054734 A1 | 2/2013 | Bond et al. |
| 2015/0032940 A1* | 1/2015 | Karamcheti .......... G06F 3/0653 |
| | | 711/103 |
| 2016/0328324 A1 | 11/2016 | Daly et al. |
| 2019/0018705 A1* | 1/2019 | Gutierrez .............. G06F 3/0647 |
| 2019/0034363 A1 | 1/2019 | Palermo et al. |
| 2019/0220407 A1* | 7/2019 | Duran Gonzalez ......................... |
| | | G06F 12/0891 |
| 2019/0377594 A1* | 12/2019 | Xie .................... G06F 9/45558 |
| 2020/0034176 A1* | 1/2020 | Calciu ................ H04L 67/2842 |

\* cited by examiner

METHODS AND APPARATUS FOR ACCELERATING VIRTUAL MACHINE MIGRATION

This application claims the benefit of provisional patent application No. 62/868,242, filed Jun. 28, 2019, which is hereby incorporated by reference herein in its entirety.

BACKGROUND

As more workloads are being run on the cloud, there is an increasing need to manage the process of migrating an application from one server node to another. Migration of a running application that uses virtual machines (VMs) from one computing resource to another is sometimes referred to as live migration or VM migration.

In conventional live migration, a virtual machine manager orchestrates a migration event by transferring a virtual machine (VM) state from a source server to a destination server. The VM state includes a collection of VM pages and is partitioned into a static portion and a dynamic portion. The static portion of the VM state is guaranteed to never change and is transferred to the destination server at the beginning of the migration via standard remote direct memory access (RDMA) protocol.

In contrast, the dynamic portion of the VM state is moved iteratively after a snapshot of a VM page is moved. If the state of that VM page changes in any way, then the latest copy of that VM page is moved once again. Even if a single cache line in the VM page is altered, the entire page needs to be moved since the VMM has no ability to know which cache line has been updated. This process continues until the number of dirty VM pages reaches some predetermined threshold, after which the VM at the source serve is halted and finally migrated to the destination server. Performing VM migration based on only page-level granularity tracking in this way is very time consuming and limits the ability to for the cloud to host large databases and other high performance computing workloads.

It is within this context that the embodiments herein arise.

DETAILED DESCRIPTION

The present embodiments relate to a system having a host processor configured to host one or more virtual machines and a coprocessor operable to communicate with the host processor via a cache coherency protocol. In particular, the coprocessor may be configured to track clean versus dirty memory bits at the cache line granularity level and to independently monitor the state of the virtual machine (VM) memory. Configured in this way, the amount of data required to be transferred can be significantly reduced so that the system is able to migrate the VM state over a network at increased speeds. This will allow cloud service providers to better allocate and manage their data center resources and reduce their overall cost of ownership.

It will be recognized by one skilled in the art, that the present exemplary embodiments may be practiced without some or all of these specific details. In other instances, well-known operations have not been described in detail in order not to unnecessarily obscure the present embodiments.

Figure 1:
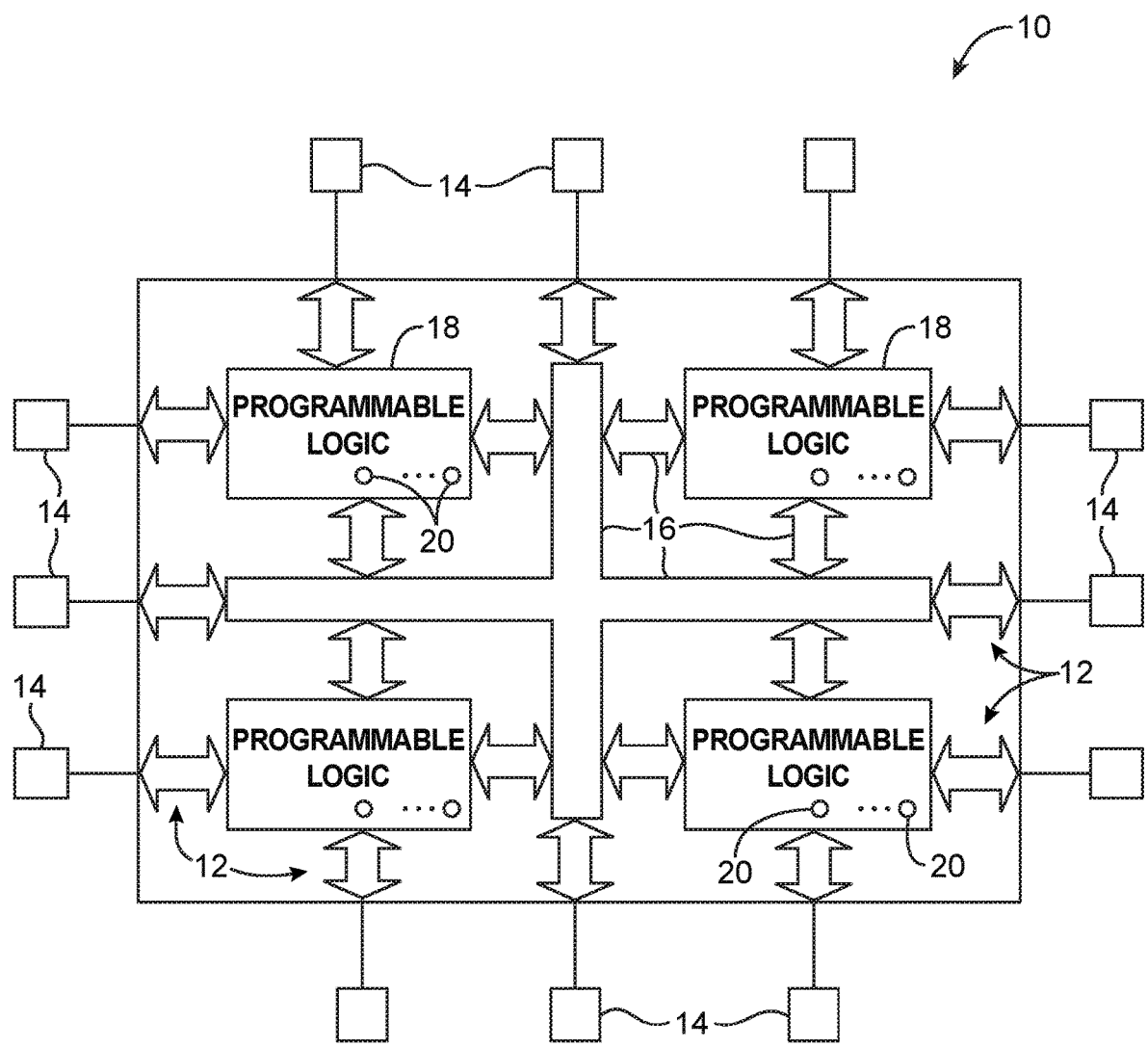
FIG. 1 is a diagram of an illustrative programmable integrated circuit in accordance with an embodiment.

Device arrangements in which the coprocessor is implemented as a programmable integrated circuit are sometimes described as an example herein. FIG. 1 is a diagram of an illustrative programmable integrated circuit 10 in accordance with an embodiment. Programmable integrated circuit 10 is sometimes referred to as a programmable logic device (PLD) or a field-programmable gate array (FPGA) device may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
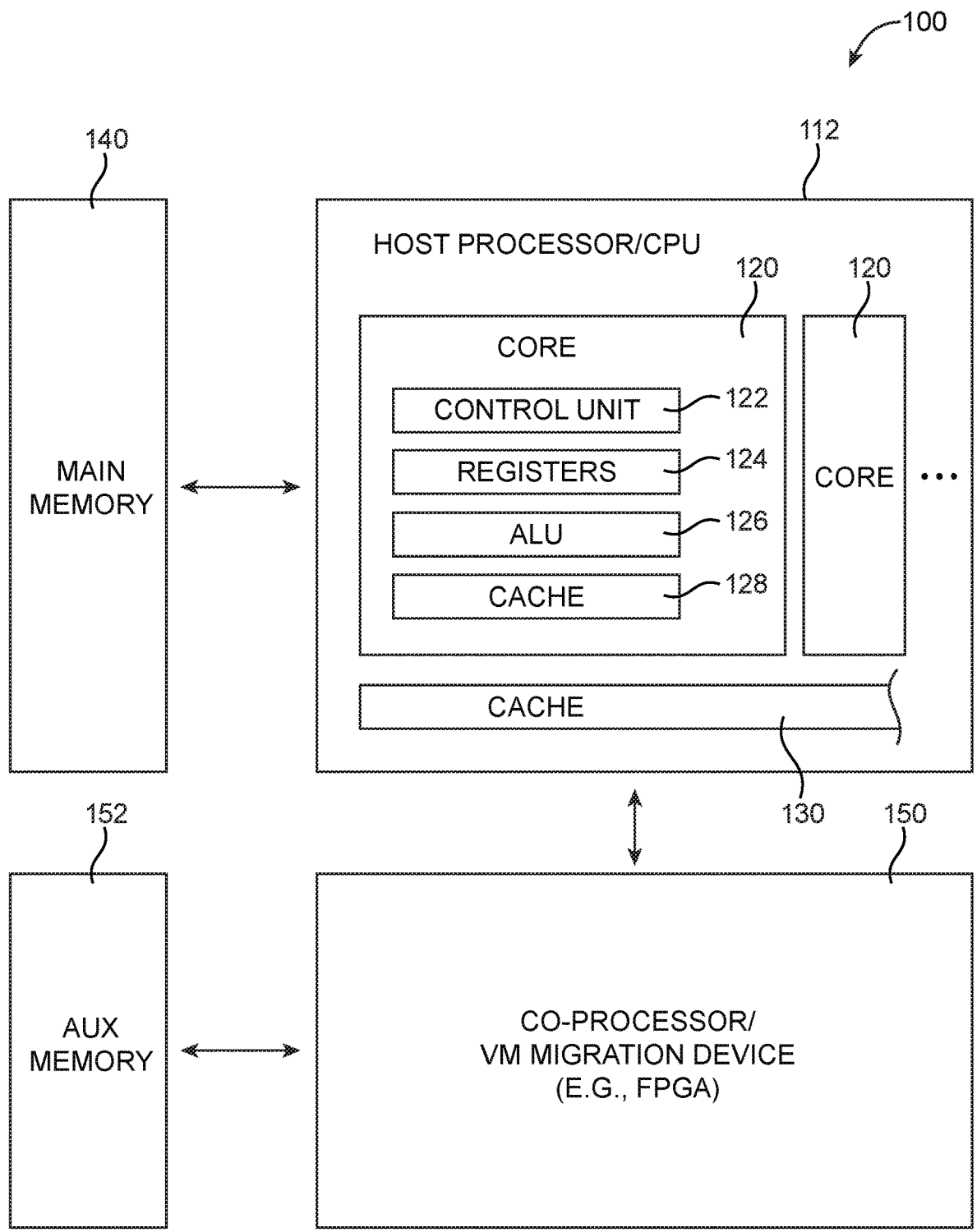
FIG. 2 is a diagram of an illustrative system having a host processor coupled to a programmable coprocessor in accordance with an embodiment.

Programmable device 10 may be used as part of a larger system to help accelerate certain tasks. As an example, programmable device 10 may used as part of a server to help accelerate data migration. FIG. 2 is a diagram of an illustrative server node that includes a host processor coupled to a programmable coprocessor. As shown in FIG. 2, system 10 includes a host processor such as host processor 112, memory such as main memory 140 that is connected to host processor 112, and a coprocessor such as coprocessor 150 on which one or more computationally intensive tasks can be offloaded from host processor 112.

Host processor 112 may for example be a central processing unit (CPU), a microprocessor, a microcontroller, or a graphics processing unit (GPU) that is optionally implemented as an application specific integrated circuit (ASIC) device or an application specific standard product (ASSP) device. Host processor 112 (sometimes referred to as a host CPU or simply CPU) may include one or more processing cores 120 for processing instructions of a computer program. Each processor core 120 may include a control unit 122, registers 124, an arithmetic logic unit (ALU) 126, and an associated memory cache 128.

Control unit 122 may be responsible for orchestrating the overall operation of core 120 and may include circuits for fetching instructions stored in program memory, decoding the fetched instructions, and then sending out the decoded instructions for execution. If needed, arithmetic logic unit 126 may be used to perform arithmetic and logical/Boolean operations on the data as specified in the instructions. The results of the executed operation may be stored back into memory. Registers 124 may provide high-speed special-purpose temporary storage for core 120. Registers 124 may include instruction registers for storing the instruction currently being executed, data registers for storing data waiting to be processed or data resulting from the current process, address registers, status registers, program state registers, etc.

Memory cache 128 is a smaller and faster memory that stores copies of data from recent or frequently used main memory locations, so subsequent requests from the processor can be served faster as opposed to retrieving the data from the main memory 140 (i.e., a relatively time consuming process). In the example of FIG. 2, CPU 112 may also include cache 130 that sits below cache 128 in the overall hierarchy and can optionally be shared among two or more CPU cores 120.

Main memory 140 refers to physical memory that can be directly accessed by host CPU 112. Main memory 140 is traditionally implemented using volatile memory components such as dynamic random-access memory (DRAM). Main memory (sometimes also referred to as primary storage) is distinguished from external mass storage devices such as disk drives, optical drives, and tape drives. Host processor 112 can only manipulate data that is stored in main memory 140. Thus, every program that is executed or every file that is accessed must be copied from the external mass storage device into main memory 140. The amount of storage in memory main 140 determines how many programs can be executed at any point in time and the amount of data that can be made readily available to the program.

Coprocessor 150 may be a programmable integrated circuit device or a programmable logic device (see, e.g., FIG. 1). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few. Configurations in which coprocessor 150 is implemented as an FPGA is described herein as an example. Coprocessor 150 may also be coupled to another external memory device sometimes referred to as auxiliary memory 152 (e.g., a double data rate or quad data rate memory).

Coprocessor 150 may be configured to provide acceleration hardware resources for host CPU 112. CPU 112 may include (for example) a Peripheral Component Interconnect Express (PCIe) controller and/or a coherent point-to-point interconnect controller such as the UltraPath Interconnect (UPI) controller, the QuickPath Interconnect (QPI), and the Compute Express Link (CXL) developed by INTEL Corporation for communicating with coprocessor 150. The PCIe controller manages a non-coherent interconnect, whereas the coherent point-to-point interconnect controller manages a "coherent" interconnect that operates in accordance with a predetermined cache coherency protocol supported by the host processor. Arranged as such, FPGA 150 may therefore be referred to as a coherent-attached coprocessor that is configured to accelerate VM migration.

Figure 3:
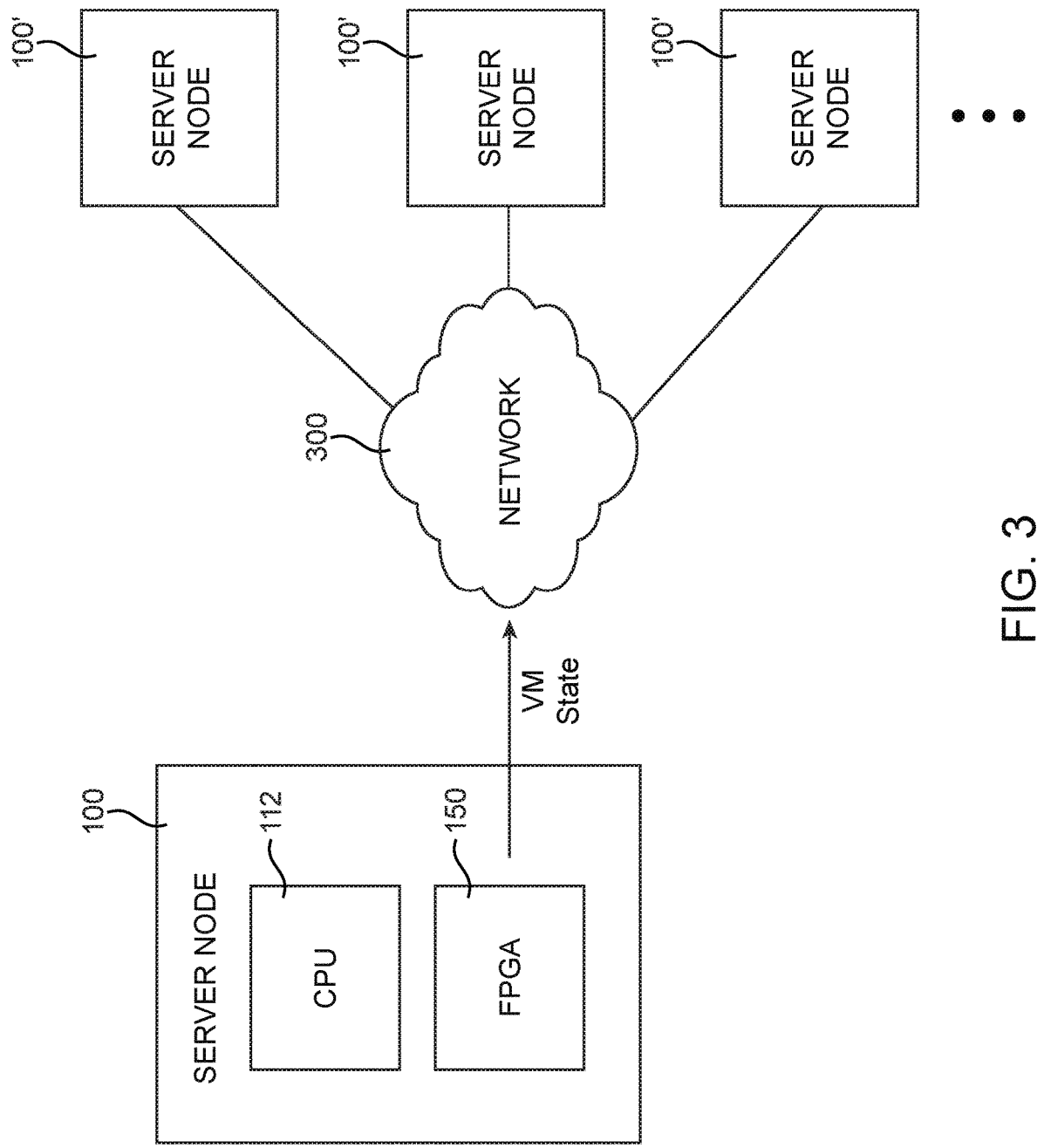
FIG. 3 is a diagram of an illustrative system of multiple server nodes that are interconnected via a network in accordance with an embodiment.

FIG. 3 is a diagram of an illustrative system of multiple server nodes that are interconnected via a network in accordance with an embodiment. As shown in FIG. 3, a first server such as server node 100 of the type shown in FIG. 2 may be coupled to one or more remote server nodes 100' via network 300. The remote server nodes 100' may have similar structure and functionality as server node 100. Each server node may be configured to host one or more virtual machines having respective VM states. The system of FIG. 3 may be configured to support data migration events such as migrating a virtual machine (VM) state from one server node (sometimes referred to as a "source server") to another server node (sometimes referred to as a "destination server"). The host CPU 112 within the source server may use the coherent-attached FPGA 150 to help accelerate the VM migration over network 300 to the destination server node.

Figure 4:
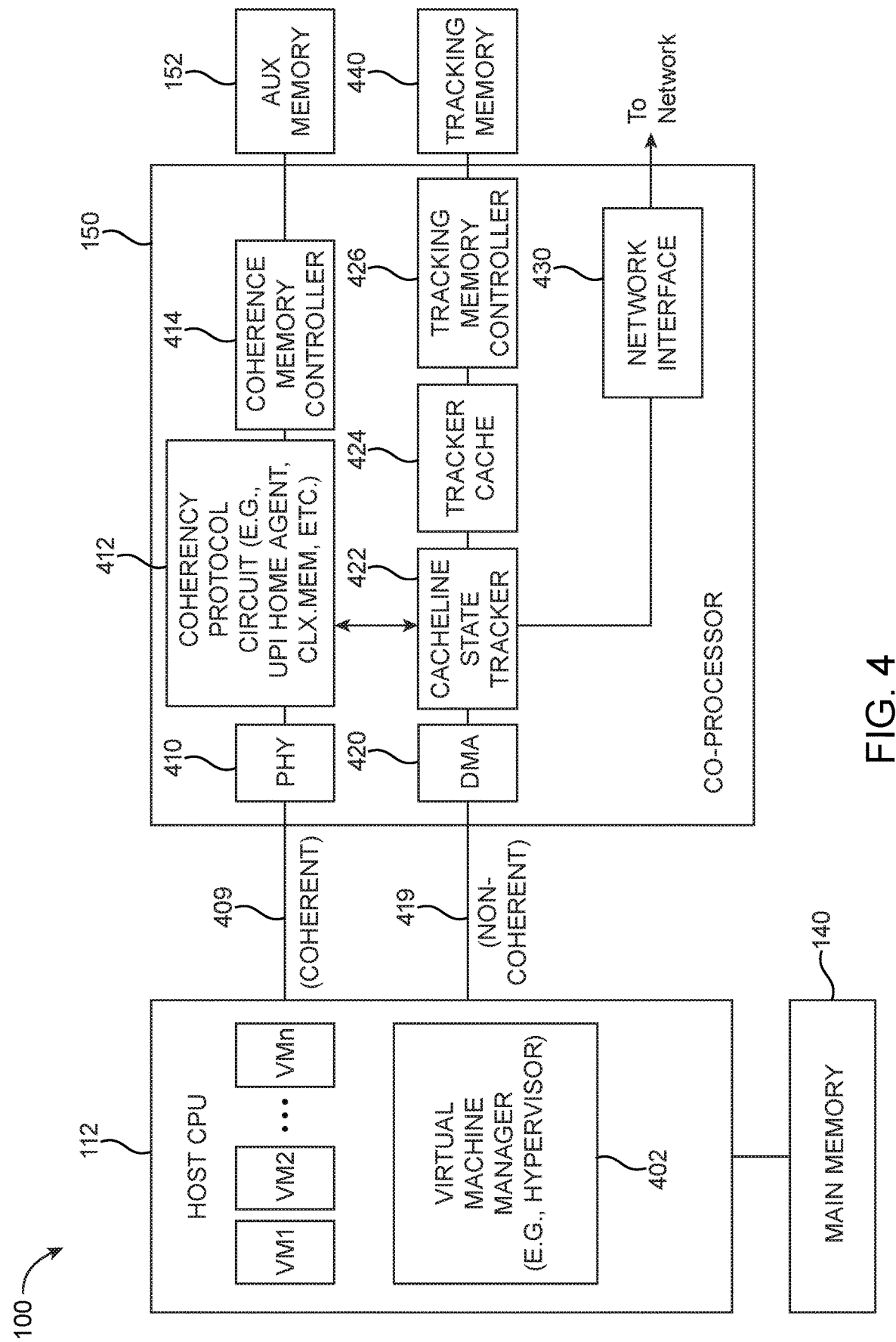
FIG. 4 is a diagram of an illustrative server having a host processor and a coprocessor with cache line state tracking circuitry in accordance with an embodiment.

FIG. 4 is a diagram of an illustrative server 100 having a host processor 112 and a coprocessor 150 with cache line state tracking circuitry in accordance with an embodiment. A host operating system (OS) may be loaded on host CPU 112. The host OS may implement a hypervisor 402 that facilitates the use of one or more virtual machines (e.g., virtual machines VM1, VM2, . . . , VMn) on host processor 112. Virtual machines are self-contained virtualized partitions that simulate an independent hardware computing resource. Hypervisor 402 may be part of the software or firmware running on host processor 112 and may serve as a virtual machine monitor (sometimes also referred to as a virtual machine manager or VMM) that manages the system's hardware resources so they are distributed efficiently among the virtual machines (VMs) on server 100.

Each virtual machine may be referred to as a guest machine running its own guest operating system (OS). Each virtual machine may be used to run one or more user applications. Hypervisor 402 presents the VM's guest OS with a virtual operating platform and manages the execution of the guest operating systems while sharing virtualized hardware resources. Hypervisor 402 may run directly on the host's hardware (as a type-1 bare metal hypervisor) or may run on top of an existing host operating system (as a type-2 hosted hypervisor). If desired, additional virtualization drivers and tools (not shown) may be used to help each guest virtual machine communicate more efficiently with the underlying physical hardware of host CPU 112 or the hardware acceleration resources provided by programmable coprocessor 150. In general, processor 112 may be configured to host at least two VMs, two to ten VMs, more than ten VMs, hundreds of VMs, thousands of VMs, or any suitable number of virtual machines.

In general, the software running on host CPU 112 may be implemented using software code stored on non-transitory computer readable storage media (e.g., tangible computer readable storage media). The software code may sometimes be referred to as software, data, program instructions, instructions, script, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of host processor 112.

Host processor 112 may be coupled to main memory 140, as already described above in connection with FIG. 2. Host processor 112 may further communicate with programmable device 150 via a host interface such as host interface 409 and 419. Host interface 409 may be a coherent computer bus interface such as UltraPath Interconnect (UPI), QuickPath Interconnect (QPI), Compute Express Link (CXL), Cache Coherent Interconnect for Accelerators (CCIX), Gen-Z, Open Coherent Accelerator Processor Interface (Open-CAPI), Intel Accelerator Link (IAL), Nvidia's NVLink, or other computer bus interfaces. In contrast, host interface 419 may be a non-coherent computer bus interface such as the PCIe (Peripheral Component Interconnect Express) interface. In general, host interfaces 409/419 may be implemented using multiple data lanes (e.g., at least 2 lanes, at least 4 lanes, at least 8 lanes, at least 16 lanes, at least 32 lanes, at least 64 lanes, etc.), single data lane, parallel data bus, serial data bus, or other computer bus standards that can support data transfer rates of at least 250 MBps (megabytes per second), 500 MBps, 1 GBps (Gigabytes per second), 5 GBps, 10 GBps, 16 GBps, 32 GBps, 64 GBps, or more.

Coprocessor 150 may include a physical-layer interface component (oftentimes abbreviated as "PHY") 410 coupled to the coherent interconnect 409. Data conveyed across interface 409 may be transferred in accordance with a predetermined cache coherency protocol selected by the host CPU. The PHY component 410 may include physical medium dependent (PMD) sublayer blocks (e.g., transceiver blocks), physical coding sublayer (PCS) blocks (e.g., a sublayer that determines when a functional link has been established and performs coding such as 64*b*/66*b* encoding), and physical medium attachment (PMA) blocks that serve as an interface between the PMD blocks and the PCS blocks. Coprocessor 150 may also include a direct memory access (DMA) interface controller 420 coupled to non-coherent interconnect 419 (e.g., a PCIe interconnect). DMA controller 420 may allow coprocessor 150 to access main memory 140 with minimal intervention from host processor 112 and may also allow the host CPU to manage the FPGA coprocessor as a standard PCIe device for initialization, networking, or other desired processes.

Coprocessor 150 may further include a coherence protocol home agent circuit 412 and an associated coherence memory controller 414 coupled between PHY block 410 and the auxiliary memory 152 that is externally attached to coprocessor 150. Memory controller 414 allows the home agent 412 to access auxiliary memory 152. Auxiliary memory 152 may serve as part of the OS-managed system memory and is sometimes referred to as the home agent memory. Interface 409 therefore enables coprocessor 150 to host OS-managed system memory. Coprocessor 150 may also include a cache line state tracker circuit 422 and associated tracker cache 424 and tracking memory controller 426 coupled between the DMA component 420 and tracking memory 440 that is externally attached to coprocessor 150. Memory controller 426 allows the state tracker 422 to access tracking memory 440. Coprocessor 150 also includes a network interface component such as network interface controller 430 for connecting system 100 to the network.

Figure 5:
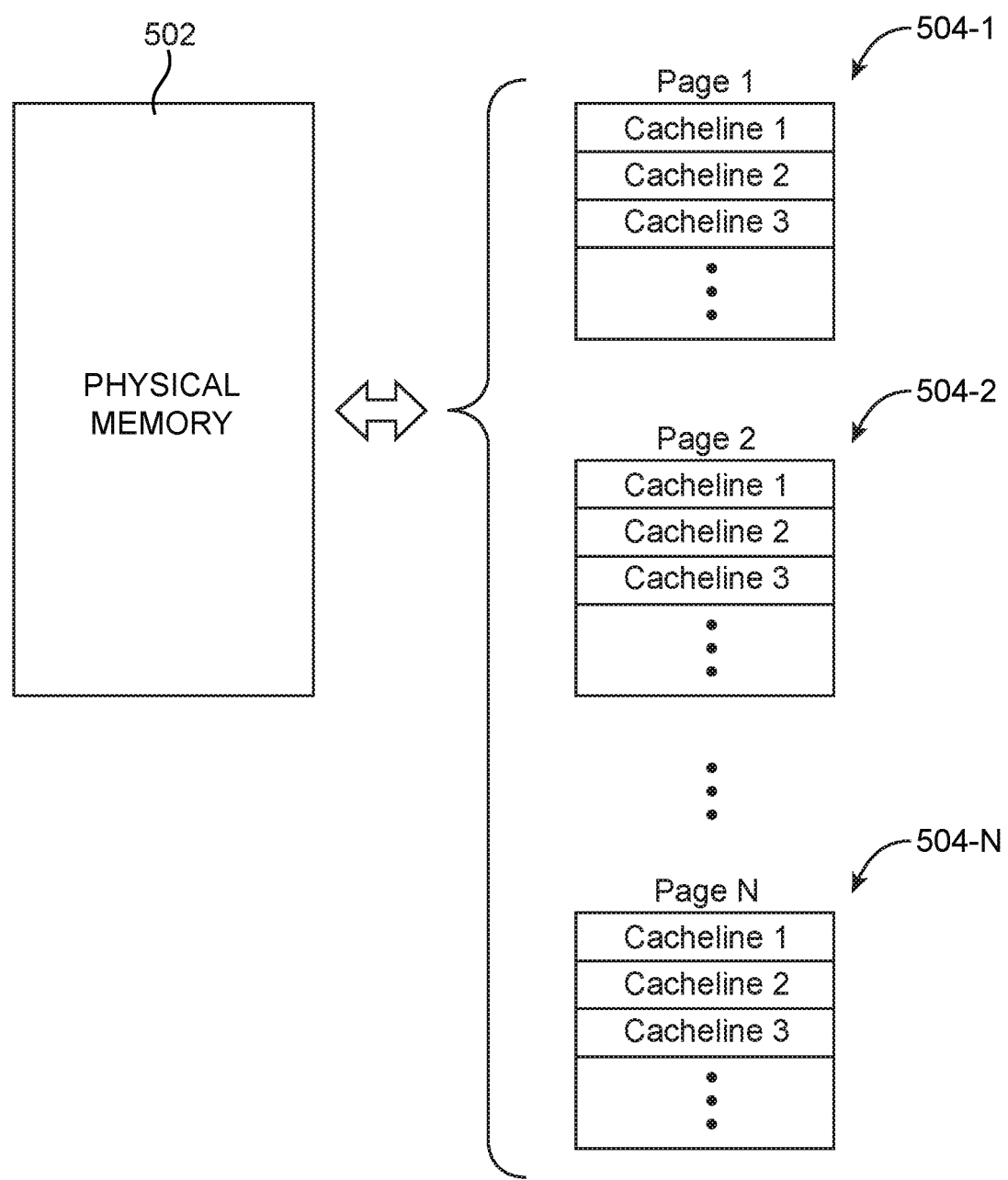
FIG. 5 is a diagram illustrating how physical memory can be mapped to multiple virtual machine (VM) pages in accordance with an embodiment.

Coherence protocol home agent 412 allows the FPGA coprocessor to track the state of every cache line associated with the hosted auxiliary memory 152 by exposing the state of every cache line to state tracker circuit 422, which can then decide if the cache line needs to be copied over to a remote server node. FIG. 5 is a diagram illustrating how CPU physical memory can be mapped to multiple virtual machine (VM) pages in accordance with an embodiment. As shown in FIG. 5, physical memory 502 may be mapped to N different VM pages 504-1, 504-2, . . . , and 504-N, where N represents any suitable integer greater than or equal to one. Each VM page may further include multiple cache lines. Coprocessor 150 may be configured to track the state of individual cache lines instead of entire pages. This ability for the FPGA coprocessor to track dynamic VM state at the cache line granularity can significantly reduce the amount of data that needs to be transferred during a data migration event.

This example in which coprocessor 150 tracks "dirty" memory bits (i.e., data that has be modified by the CPU) versus "clean memory bits (i.e., data that has not be modified by the CPU) at the cache line granularity level is merely illustrative and is not intended to limit the scope of the present embodiments. If desired, the coprocessor may be configured to track or monitor dirty data bits at any suitable granularity or level of accuracy such that the amount of data being transferred during VM migration events is kept at a manageable level, even for systems that host a large number of virtual machines and high performance computing workloads.

Referring back to FIG. 4, home agent 412 may allow auxiliary memory 152 to be exposed as OS-managed standard system memory. In other words, the main memory 140 and the auxiliary memory 152 may appear as one contiguous "coherent" memory space from the perspective of the host CPU. For example, the home agent 412 may advertise to a BIOS (Basic Input/Output System) component on the host CPU how much memory is accessible to the CPU, which enables the BIOS to build standard data structures that are used by the operating system to build the overall system memory map. The term "home agent" may be specific to the UPI interconnect interface. If the host interface 409 were the CXL interconnect, the equivalent function to the home agent is referred to as the "CXL.mem" controller. Circuit 412 that provides the UPI home agent or CXL.mem functionality for any cache coherent interface may sometimes be referred to generically as a coherency protocol circuit, a cache coherent protocol circuit, or a coherency protocol OS-managed controller circuit (i.e., a circuit that is connected to the host via a cache coherent interface and that is configured to expose the auxiliary memory to the host as system memory that is OS-managed).

The home agent 412 represents an entity which services coherent transactions, including handshaking as necessary with associated caching agents, and is used to supervise a portion of the coherent memory. The home agent is responsible for managing conflicts that might arise among different caching agents and provides appropriate data and ownership responses as required by the flow of a given transaction by participating in the cache coherency protocol. The home agent may keep track of the coherency state of each cache line (or other desired level of memory granularity) and knows if a particular cache line is cached in another CPU or that cache line has been modified by the host CPU.

The cache line state tracker circuit 422 may be configured to receive the coherency state information from home agent 412 and to manage when and how individual cache lines are migrated to the destination node via the network interface 430. State tracker 422 may also implement and maintain a directory of states for each cache line hosted by the coprocessor by monitoring all read and write operations to the auxiliary memory 152. At least a portion of the cache line state directory may be temporarily stored at tracker cache 424 for quick retrieval and/or may be stored entirely within external tracking memory 440 accessed via memory controller 426. Depending on the amount of memory that is managed by the home agent, the directory structure may implement two bits per cache line (as an example). For instance, in a scenario where there are hundreds of gigabytes hosted by the FPGA home agent, there should be 100s of megabytes of tracker memory to store the cache line information.

During migration, virtual machine (VM) state information stored in auxiliary memory 152 may be migrated from the source server to a remote destination server. As described above, state tracker 422 may monitor all read and write operations to the auxiliary memory 152 to determine what pages are being accessed. The cache line directory (or other suitable state tracking data structure) may store state information for each cache line in memory 152 being written to or read from. The state information of each cache line may be encoded using two bits (as an example), the polarity of which can be updated based on the transactions that occur on the coherent interface 409.

Figure 6:
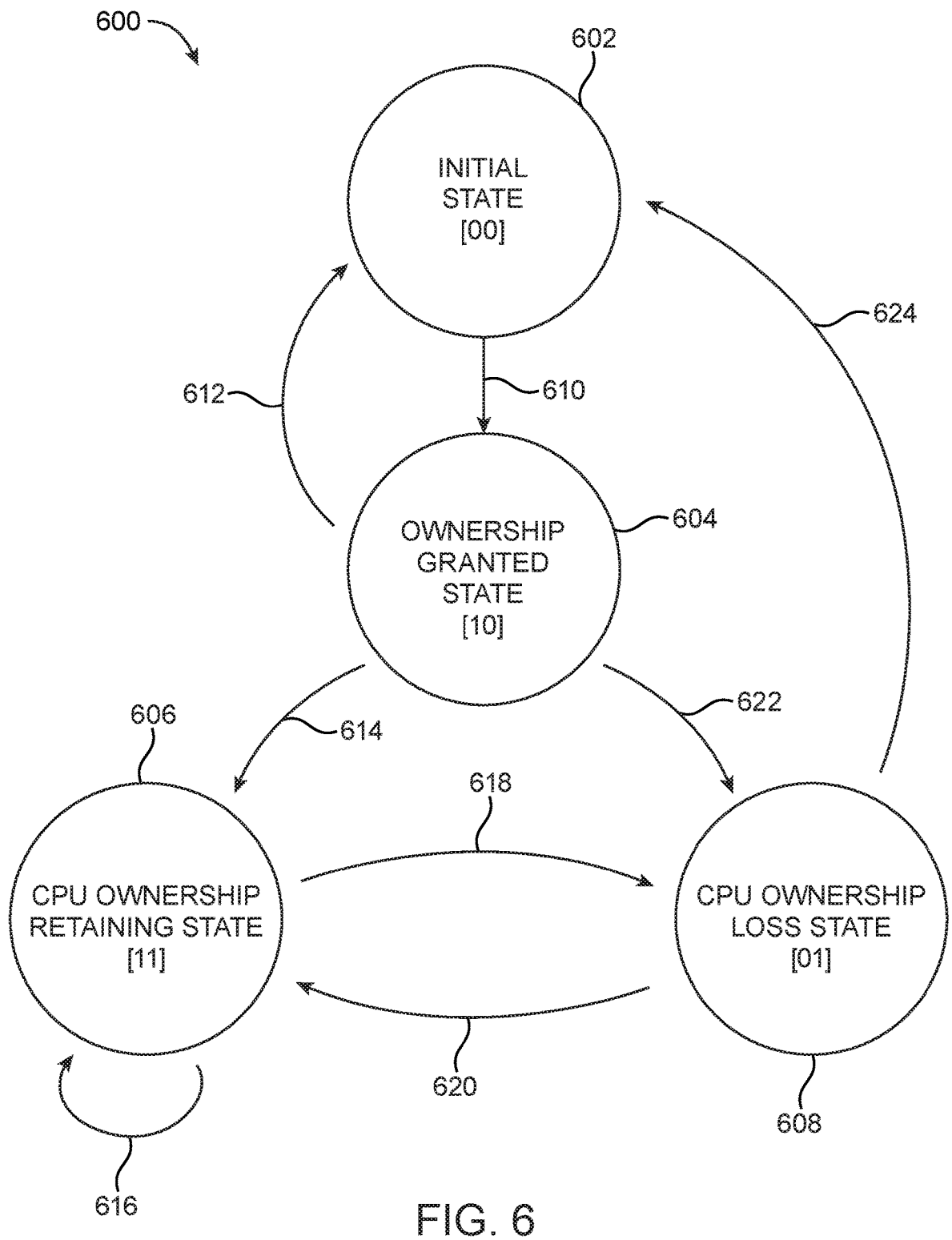
FIG. 6 is a diagram illustrating possible states of a virtual machine (VM) cache line in accordance with an embodiment.

State tracker 422 can read the state of any individual cache line from the overall cache line directory and decide when and how it will move that cache line over to the remote destination server node. FIG. 6 is a state diagram 600 illustrating possible directory states of a VM cache line in accordance with an embodiment. The various states of FIG. 6 may depend on events observed from the point of view of the FPGA home agent (as an example). As shown in FIG. 6, a given cache line may start in an initial state 602 where the cache line state is reset to "00" (e.g., the upper bit B1 and the lower bit B0 are both cleared to zero). The cache line will remain in this state as long as it is untouched by the host CPU.

When the coprocessor home agent has granted ownership of the given cache line to the host CPU, the cache line state is changed to "10" and enters the ownership granted state 604 via state transition path 610 to indicate that the host CPU has been granted ownership of that particular cache line. If the host processor gives up ownership of that cache line without modifying any data as determined by the home agent, then the cache line state will revert back to the initial state 602 via state transition path 612. If, however, the host processor performs a write operation while retaining ownership of that cache line as determined by the home agent, then the cache line state is changed to "11" and enters the CPU ownership retention state 606 via state transition path 614. The cache line state will remain at state 606 so long as the host processor performs data writeback while retaining ownership of that cache line, as indicated by loopback path 616.

At this point, if the host processor gives up ownership of the given cache line as determined by the home agent, then the cache line state is changed to "01" and enters the CPU ownership loss state 608 via state transition path 618. It is also possible to transition from state 604 to state 608 if the host CPU performs a writeback operation while subsequently giving up ownership of that cache line, as indicated by state transition path 622. State 608 means that the cache line has been modified after it has been previously moved and may cause the coprocessor to move that cache line to the remote node and then return to the initiate state (see transition 624). If, however, the CPU regains ownership of the cache line as determined by the home agent, the cache line state would change from the CPU ownership loss state 608 back to the CPU ownership retaining state 606, as indicated by transition 620.

Figure 7:
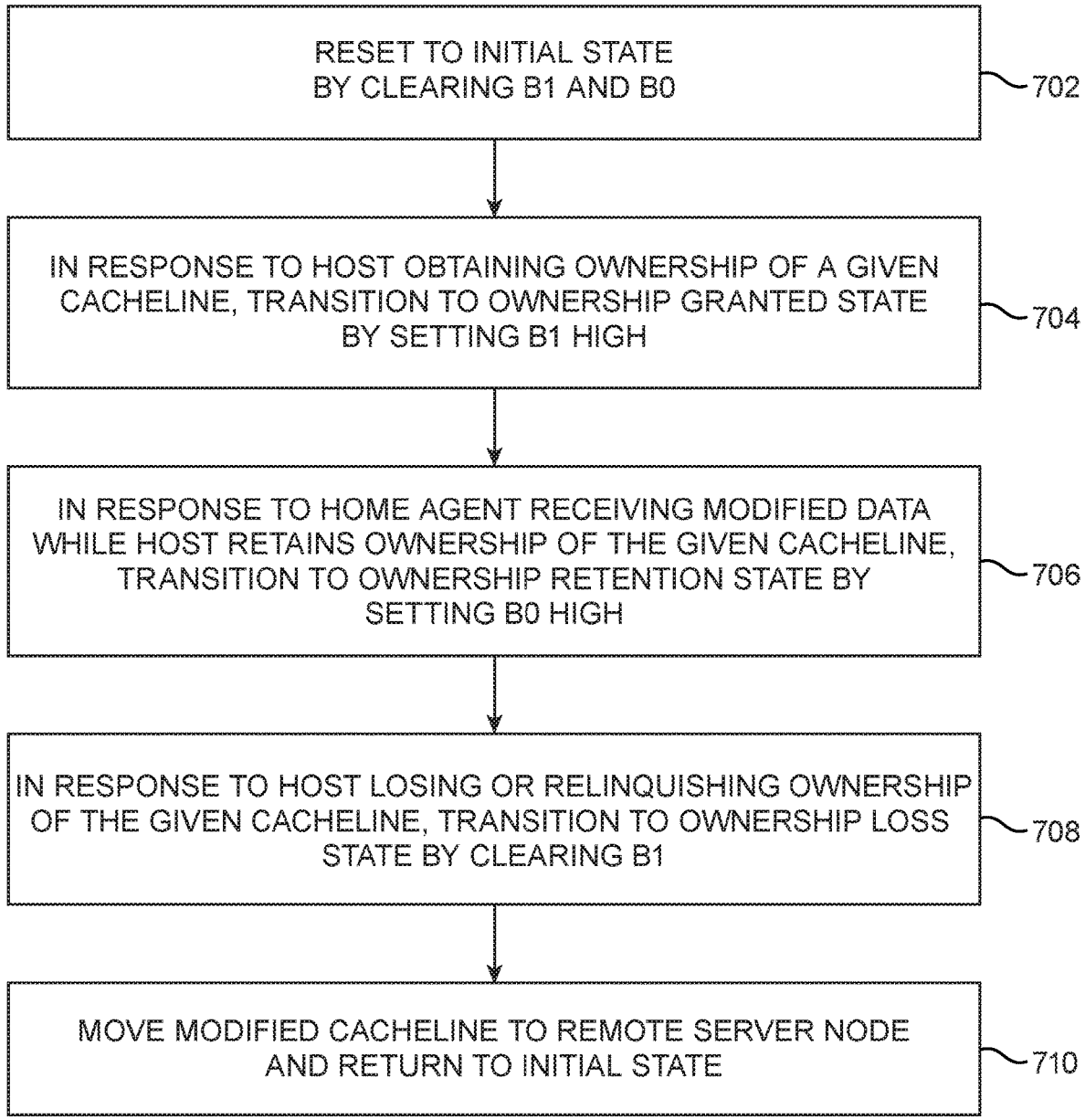
FIG. 7 is flow chart of illustrative steps for using a coprocessor to support virtual machine migration with cache line granularity tracking capability in accordance with an embodiment.

FIG. 7 is flow chart of illustrative steps for using a coherent-attached coprocessor to support virtual machine migration with cache line granularity tracking capability. At step 702, the state tracker may reset each cache line state to the initial state by clearing upper bit B1 and lower bit B0. In response to the host CPU obtaining ownership of a particular cache line, the state of that cache line may transition from the initial state to the ownership granted state by setting bit B0 high (e.g., to enter state "10" at step 704).

In response to the coprocessor home agent receiving modified data while the host CPU retains ownership of the particular cache line, the cache line state may transition to the ownership retention state by setting bit B0 high (e.g., to enter state "11" at step 706). In response to the host CPU losing or relinquishing ownership of the particular cache line, the cache line state may transition to the ownership loss state by clearing bit B0 (e.g., to enter state "01" at step 708). At this point, unless the CPU regains ownership of the cache line, the modified cache line may be moved to the remote destination server node and revert back to the initial state (step 710).

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Examples

The following examples pertain to further embodiments.

Example 1 is an integrated circuit, comprising: a memory controller configured to access an external memory storing virtual machine (VM) state information, wherein the VM state information is organized into a plurality of pages each of which includes a plurality of cache lines; a coherency protocol circuit configured to expose the external memory as an operating system (OS) managed system memory to an external host processor coupled to the integrated circuit, to service transactions issued from the external host processor, and to monitor the state of individual cache lines in the plurality of pages at a cache line granularity; and a state tracker circuit configured to analyze the state of individual cache lines and to determine when it is appropriate to migrate individual cache lines to a remote server node to optimize total migration time.

Example 2 is the integrated circuit of example 1, wherein the transactions received at the coherency protocol circuit is optionally issued in accordance with a cache coherency protocol.

Example 3 is the integrated circuit of any one of examples 1-2, optionally further comprising a coherence memory controller coupled between the coherency protocol circuit on the integrated circuit and the external memory storing the VM state information.

Example 4 is the integrated circuit of any one of examples 1-3, optionally further comprising a direct memory access (DMA) controller coupled between the state tracker circuit on the integrated circuit and the external host processor.

Example 5 is the integrated circuit of any one of examples 1-4, wherein the coherency protocol circuit is optionally further configured to communicate with the external host processor via a predetermined cache coherent interconnect, and wherein the state tracker circuit is optionally further configured to communicate with the external host processor via a non-coherent interconnect.

Example 6 is the integrated circuit of any one of examples 1-5, wherein the state tracker circuit is optionally further configured to receive coherency state information for individual cache lines from the coherency protocol circuit.

Example 7 is the integrated circuit of example 6, wherein the state tracker circuit optionally keeps track of the received coherency state information using a cache line directory.

Example 8 is the integrated circuit of example 7, optionally further comprising a tracking cache configured to store at least a portion of the cache line directory.

Example 9 is the integrated circuit of any one of examples 7-8, optionally further comprising an additional memory controller configured to access an additional external memory configured to store the cache line directory.

Example 10 is the integrated circuit of example 7-9, wherein each entry in the cache line directory optionally includes bits for representing whether the external host processor has been granted ownership of a respective cache line in the plurality of pages.

Example 11 is the integrated circuit of example 7-10, wherein each entry in the cache line directory optionally includes bits for representing whether the external host processor has lost ownership of a respective cache line in the plurality of pages.

Example 12 is the integrated circuit of example 7-11, wherein each entry in the cache line directory optionally includes bits for representing whether the external host processor has modified a respective cache line in the plurality of pages.

Example 13 is a method of operating an integrated circuit, the method comprising: with a memory controller in the integrated circuit, accessing an external memory that stores virtual machine (VM) state information, wherein the VM state information is organized into a plurality of pages each of which includes multiple cache lines; with a home agent in the integrated circuit, exposing the external memory as an operating system (OS) managed system memory to an external host processor coupled to the integrated circuit; and with a state tracker in the integrated circuit, receiving coherency state information from the home agent and optimizing virtual machine (VM) migration by managing when individual cache lines in the plurality of pages is migrated to a destination server node.

Example 14 is the method of example 13, optionally further comprising using the home agent to determine when the external host processor obtains ownership of a given cache line in the plurality of pages.

Example 15 is the method of example 14, optionally further comprising using the home agent to determine when the external host processor modifies data in the given cache line.

Example 16 is the method of example 15, optionally further comprising using the home agent to determine when the external host processor gives up ownership of the given cache line.

Example 17 is the method of example 16, optionally further comprising: in response to determining that the external host processor has modified the given cache line and given up ownership of the given cache line, moving the given cache line to the destination server node.

Example 18 is a system, comprising: a host central processing unit (CPU), wherein the host CPU is configured to host a plurality of virtual machines; main memory connected to the host CPU; a programmable coprocessor coupled to the host CPU; and auxiliary memory connected to the programmable coprocessor, wherein the auxiliary memory is configured to store virtual machine (VM) state information for the plurality of virtual machines, wherein the VM state information is organized into a plurality of pages each of which includes multiple cache lines, and wherein the programmable coprocessor comprises a cache line state tracker configured to determine when to migrate individual cache lines from the auxiliary memory over to a remote server.

Example 19 is the system of example 18, wherein the programmable coprocessor optionally further comprises a cache coherence protocol circuit configured to expose coherency state information to the cache line state tracker.

Example 20 is the system of any one of examples 18-19, wherein the cache line state tracker is optionally configured to implement and maintain a cache line directory, and wherein the cache line directory includes bits indicative of whether an individual cache line has been modified by the host CPU and whether the host CPU has obtained or given up ownership of that cache line.

The foregoing is merely illustrative of the principles of this invention and various modifications can be made by those skilled in the art. The foregoing embodiments may be implemented individually or in any combination.

What is claimed is:
1. An integrated circuit, comprising:
a memory controller, electrically coupled to and configured to access an external memory storing virtual machine (VM) state information of a VM, wherein the VM state information is organized into a plurality of pages each of which includes a plurality of cache lines;
processing circuitry electrically coupled to and configured to interface with an external host processor to run the VM while the VM state information is migrated to a remote server node via live migration;
a coherency protocol circuit configured to expose the external memory as an operating system (OS) managed system memory to the external host processor coupled to the integrated circuit, to service transactions issued from the external host processor, and to monitor the state of individual cache lines in the plurality of pages at a cache line granularity; and
a state tracker circuit configured to analyze one or more external host processor ownership states associated with individual cache lines of the plurality of cache lines while the VM is running on the external host processor, and to determine when it is appropriate to migrate the individual cache lines to a remote server node based on the one or more external host processor ownership states for each of the individual cache lines to optimize total migration time.

2. The integrated circuit of claim 1, wherein the transactions received at the coherency protocol circuit are issued in accordance with a cache coherency protocol.

3. The integrated circuit of claim 1, further comprising a coherence memory controller coupled between the coherency protocol circuit on the integrated circuit and the external memory storing the VM state information.

4. The integrated circuit of claim 1, further comprising a direct memory access (DMA) controller coupled between the state tracker circuit on the integrated circuit and the external host processor.

5. The integrated circuit of claim 1, wherein the coherency protocol circuit is further configured to communicate with the external host processor via a predetermined cache coherent interconnect, and wherein the state tracker circuit is further configured to communicate with the external host processor via a non-coherent interconnect.

6. The integrated circuit of claim 1, wherein the state tracker circuit is further configured to receive coherency state information for individual cache lines from the coherency protocol circuit.

7. The integrated circuit of claim 6, wherein the state tracker circuit keeps track of the received coherency state information using a cache line directory.

8. The integrated circuit of claim 7, further comprising a tracking cache configured to store at least a portion of the cache line directory.

9. The integrated circuit of claim 7, further comprising an additional memory controller configured to access an additional external memory configured to store the cache line directory.

10. The integrated circuit of claim 7, wherein each entry in the cache line directory includes bits for representing whether the external host processor has been granted ownership of a respective cache line in the plurality of pages.

11. The integrated circuit of claim 7, wherein each entry in the cache line directory includes bits for representing whether the external host processor has lost ownership of a respective cache line in the plurality of pages.

12. The integrated circuit of claim 7, wherein each entry in the cache line directory includes bits for representing whether the external host processor has modified a respective cache line in the plurality of pages.

13. A method of operating an integrated circuit, the method comprising:
with a memory controller in the integrated circuit, accessing an external memory electrically coupled to the memory controller, that stores virtual machine (VM) state information, wherein the VM state information is organized into a plurality of pages each of which includes multiple cache lines;
with processing circuitry, running the VM on the integrated circuit while the VM state information is migrated to a destination server node via live migration;
with a home agent in the integrated circuit, exposing the external memory as an operating system (OS) managed system memory to an external host processor coupled to the integrated circuit; and
with a state tracker in the integrated circuit configured to determine one or more external host processor ownership states associated with individual cache lines of the multiple cache lines, receiving coherency state information from the home agent and facilitating the live migration by managing when the individual cache lines in the plurality of pages are migrated to the destination server node based on the one or more external host processor ownership states associated with each of the individual cache lines.

14. The method of claim 13, comprising determining the one or more external host processor ownership states using the home agent to determine when the external host processor obtains ownership of a given cache line in the plurality of pages.

15. The method of claim 14, comprising determining the one or more external host processor ownership states by using the home agent to determine when the external host processor modifies data in the given cache line.

16. The method of claim 15, comprising determining the one or more external host processor ownership states by using the home agent to determine when the external host processor gives up ownership of the given cache line.

17. The method of claim 16, further comprising:
in response to determining that the external host processor has modified the given cache line and given up ownership of the given cache line, moving the given cache line to the destination server node.

18. A system, comprising:
a host central processing unit (CPU) configured to host a plurality of virtual machines, the host CPU comprising processing circuitry configured to run a virtual machine (VM) of the plurality of virtual machines on the host CPU while VM state information is migrated to a remote server via live migration;
main memory coupled to the host CPU;
a programmable coprocessor coupled to the host CPU; and
auxiliary memory coupled to the programmable coprocessor, wherein the auxiliary memory is configured to store the VM state information for the plurality of virtual machines, wherein the VM state information is organized into a plurality of pages each of which includes multiple cache lines, and wherein the programmable coprocessor comprises a cache line state tracker configured to determine one or more host CPU ownership states associated with individual cache lines of the multiple cache lines and configured to determine, while the VM is running on the host CPU, when to migrate individual cache lines from the auxiliary memory over to a remote server via live migration based on the one or more host CPU ownership states associated with each of the individual cache lines.

19. The system of claim 18, wherein the programmable coprocessor further comprises a cache coherence protocol circuit configured to expose coherency state information to the cache line state tracker.

20. The system of claim 18, wherein the cache line state tracker is configured to implement and maintain a cache line directory, and wherein the cache line directory includes bits indicative of whether an individual cache line has been modified by the host CPU and whether the host CPU has obtained or given up ownership of that cache line.

* * * * *